USO05519696A

United States Patent [19]
Willmann et al.

[11] Patent Number: 5,519,696
[45] Date of Patent: May 21, 1996

[54] METHOD OF AND FACILITY FOR RANDOMLY SELECTING ONE OUT OF N NODES, AS WELL AS A SWITCHING ELEMENT, A SWITCHING NETWORK, AND AN EXCHANGE THEREWITH

[75] Inventors: Gert Willmann; Matthias Wippenbeck, both of Stuttgart, Germany

[73] Assignee: Alcatel Sel Aktiengesellschaft, Germany

[21] Appl. No.: 361,422

[22] Filed: Dec. 21, 1994

[30] Foreign Application Priority Data

Dec. 21, 1993 [DE] Germany ........................ 43 43 588.2

[51] Int. Cl.$^6$ .............................. H04L 9/00; H04Q 11/04
[52] U.S. Cl. ............................. 370/58.2; 370/60; 380/50
[58] Field of Search .............................. 370/55, 56, 58.1, 370/58.2, 58.3, 60, 60.1, 61, 94.1, 94.2; 379/268, 269, 271, 272; 395/275, 425, 725, 800; 340/825.03, 826, 825.79, 825.8; 380/49, 50

[56] References Cited

U.S. PATENT DOCUMENTS

| 4,630,258 | 12/1986 | McMillen et al. | 370/60 |
|---|---|---|---|
| 4,890,281 | 12/1989 | Balboni et al. | 370/60 |
| 4,893,304 | 1/1990 | Giacopelli et al. | 370/60 |
| 4,991,133 | 2/1991 | Davis et al. | 370/94.1 |
| 5,173,897 | 12/1992 | Schrodi et al. | 370/60 |
| 5,315,586 | 5/1994 | Charvillat | 370/60 |
| 5,319,360 | 6/1994 | Schrodi et al. | 370/60 |

FOREIGN PATENT DOCUMENTS

| 3742941 | 11/1989 | Germany . |
| 4232652 | 4/1993 | Germany . |

OTHER PUBLICATIONS

"Design of a Broadcast Packet Network", J. Turner, *IEEE Infocom Conference*, 1986, pp. 667–675.
"Alcatel ATM Switch Fabric and Its Properties", *Electrical Communication*, vol. 64, No. 2/3, 1990, pp. 156–165.

*Primary Examiner*—Alpus H. Hsu
*Attorney, Agent, or Firm*—Ware, Fressola, Van Der Sluys & Adolphson

[57] ABSTRACT

A random distribution of a traffic stream to several traffic streams is carried out by a cyclic shifting and swapping of elements of an allocation list with at least one random operation. A switching element is implemented according to this approach, wherein incoming cells are distributed to several outputs on the basis of the periodic processing of an allocation list which is changed after each cycle by shifting and randomly swapping two list elements. This results in a simple algorithm, suitable for implementation in hardware. Such can generate all possible permutations with settable minimum and maximum delays. This solution is also usable for problems in other areas, such as efficient allocation of multiprocessor resources.

14 Claims, 2 Drawing Sheets

METHOD OF AND FACILITY FOR RANDOMLY SELECTING ONE OUT OF N NODES, AS WELL AS A SWITCHING ELEMENT, A SWITCHING NETWORK, AND AN EXCHANGE THEREWITH

TECHNICAL FIELD

The present invention relates to efficient allocation of resources and, more particularly, to a method of and a facility for randomly selecting one out of N nodes, and even more particularly, to a switching element, to a switching network, and to an exchange.

BACKGROUND OF THE INVENTION

In switching networks it frequently happens that a few internal paths are loaded particularly heavily, whereas other internal paths are loaded only lightly. This effect results from uneven traffic loads at the inlets of the switching network, from the traffic characteristic, or from correlations of the incoming traffic. One way of combatting this effect is to first mix the incoming traffic and thus distribute it over the switching network as evenly as possible.

The invention is based on a solution to this problem as is described in an article by D. Böttle and M. A. Henrion, "Alcatel ATM Switch Fabric and Its Properties", *Electrical Communication*, Vol. 64, No. 2/3, 1990, pages 156 to 165.

That article describes an ATM switching network (ATM= asynchronous transfer mode) consisting of two or more switching stages which, in turn, are constructed from two or more switching elements. The first switching stages represent distribution stages. The switching elements of these stages distribute the incoming cells across all their outputs. In the subsequent stages, path finding takes place. Here, too, multiple paths are possible. For the entire switching network, self-routing multiple-path switching elements are used, which perform a specific type of routing process depending on their stage number. The cells arriving at the input ports of such a switching element can be randomly distributed to a group of multiple links.

How this random distribution of cells to a group of links is effected is not described there.

Another switching network with traffic mixing is described in an article by J. S. Turner, "Design of a Broadcast Packet Network", IEE Infocom Conf., 1986, pp. 667–675.

The switching network consists of a distribution network and a subsequent routing network. The switching elements of the distribution network have two input ports and two output ports. They route an incoming data packet alternately to one output port and the other. If one or both output ports are unavailable, the first port to become available is used.

This method of distributing incoming data packets to two output lines has the disadvantage that the algorithm used is deterministic. This may create new correlations, and the distribution of the data packets is thus not optimal from a traffic point of view.

The problem of distributing data packets to a number of output lines corresponds to the problem of selecting one node from a number of nodes. It has turned out that this problem also arises in many other technical fields, such as in the distribution of processes to a number of available processors in a multiprocessing system. The present solution is also applicable thereto. However, the invention will be described as applied to switching technology.

A mathematician would solve this problem by calculating pseudorandom permutations. However, the algorithms required for this are quite complex and are therefore unsuitable for implementation in hardware, as is necessary for high-speed switching networks, for example.

DISCLOSURE OF INVENTION

The object of the invention is to randomly select one unit from a number of like units.

An object is attained by a method and a facility. According to the present invention, a method of randomly selecting one out of N like units is characterized in that a list containing at least N allocation elements, which each point to one of the N like units, is processed periodically in allocation cycles, that the list is changed by cyclic shift operations and swap operations, at least one of said operations being controlled on a random basis, and that allocation cycles, shift operations, and swap operations are alternated.

According to a second aspect of the present invention, a facility for randomly selecting one out of N like units is characterized in that the facility is provided with a memory device, a scrambler, and a selecting device, that the memory device contains a list with at least N allocation elements which each point to a respective one of the N like units, that the scrambler is designed to change the positions of the allocation elements in the memory device by cyclic shift operations and by swap operations, at least one of said operations being controlled on a random basis, and that the selecting device is designed to process the list in the memory device periodically in allocation cycles, thus selecting the respective unit to which the current allocation element points.

A switching element may comprise such a facility, a switching network may comprise a plurality of switching stages, at least one of which is a distribution stage which is provided with at least one such facility, or an exchange may comprise at least one such facility.

The fundamental idea of the invention is to change an allocation list by cyclic shifting and by swapping, at least one of these operations being controlled on a random basis. By this procedure, a random permutation of the elements of the original allocation list is produced.

The allocation list is processed periodically. Each element of the allocation list points to one unit of a number of like nodes. Such units may be, for example, the inputs or outputs of switching elements or available processors in a multiprocessing system.

The invention has the advantage that all possible permutations of an allocation list are randomly created. This makes the list especially suitable for traffic streams.

Another advantage is that a facility according to the invention is suitable for implementation in hardware, as is required for high-speed switching networks, for example.

Furthermore, by suitable choice of parameters, it is possible to fix minimum and maximum delays for the successive selection of a unit. This is important mainly for switching elements where time conditions exist for the successive use of inputs or outputs.

The invention will become more apparent from the following description of two embodiments and one example of use taken in conjunction with the accompanying drawing.

BEST MODE FOR CARRYING OUT THE INVENTION

In a first embodiment, according to the present invention the application of the novel method and the use of the novel facility in a traffic mixer are explained.

It should be realized, however, that the novel facility can also be used for a multitude of other tasks. Some examples are: selection of one or more channels, receivers, transmitters, processing units, memory locations, or switching elements.

Figure 1:
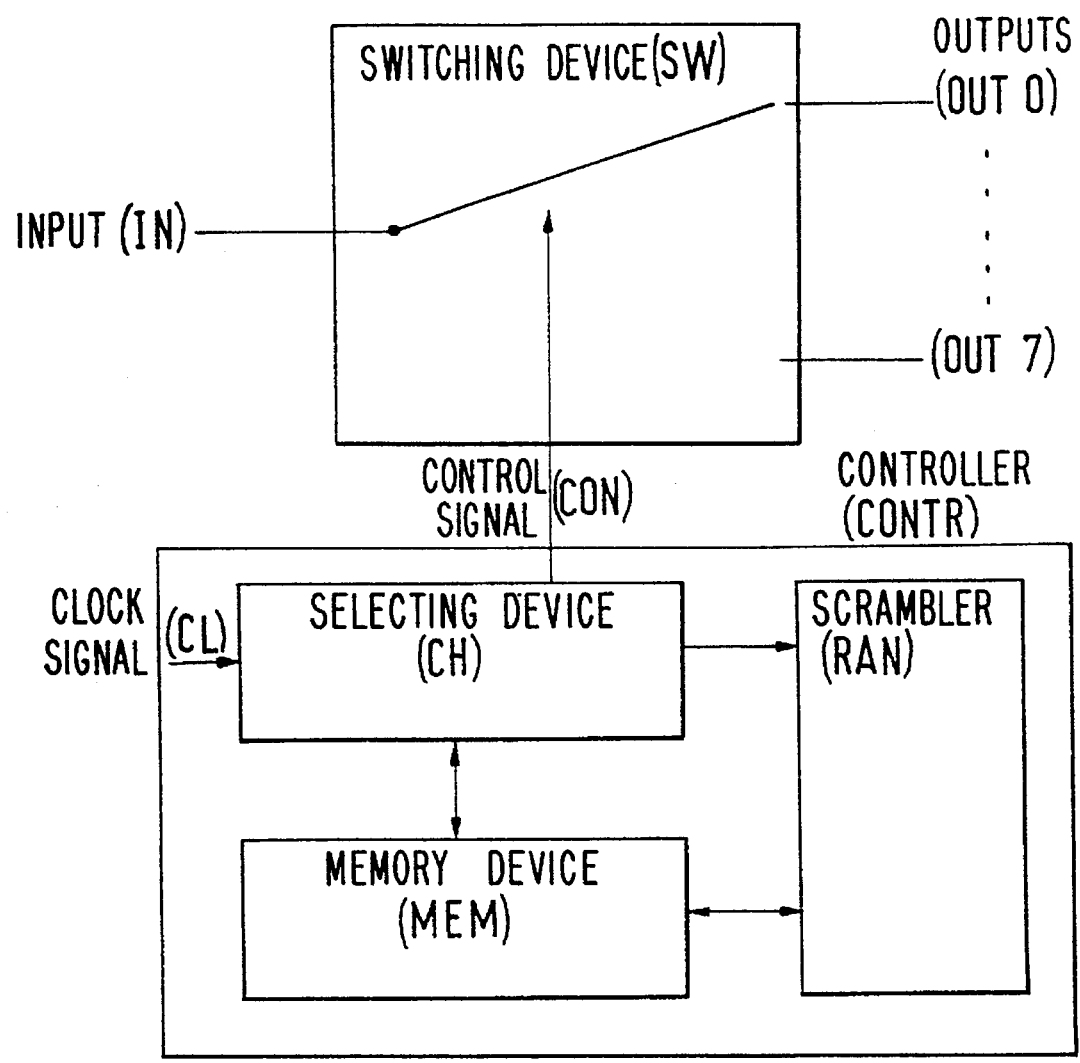
FIG. 1 is a block diagram, according to the present invention of a traffic mixer as an exemplary implementation of a novel facility for a first and a second embodiment.

FIG. 1 shows a switching device SW and a controller CONTR. The switching device SW receives a control signal CON from the controller CONTR.

The switching device SW has one or more outputs, e.g., has 8 outputs OUT0 to OUT7 and, has one or more inputs such as the illustrated presented to the input IN, which is composed, for example, of data packets or data cells, to the outputs OUT0 to OUT7. To this end, the switching device SW selects one of the outputs OUT0 to OUT7 for a given time interval, e.g., the duration of one data cell, and transfers the traffic stream from the input IN to the selected output. This selection is made in response to the control signal CON from the controller CONTR.

The outputs OUT0 to OUT7 or the input IN may also be queues for data packets or data cells. The switching device SW would then select, for example, one of the output queues at a time and write a data packet or cell from the input queue into this output queue.

In accordance with the principles of the present invention, the switching device SW may have a wide variety of different structures, e.g., may have eight inputs and one output instead of one input and eight outputs. It would then unite the traffic streams presented to the inputs into one traffic stream. Analogously to the above, the inputs or the output may be queues. It will be evident to one of skill in the art how different structures according to the teachings hereof can be implemented.

The controller CONTR contains a selecting device CH, a memory device MEM, and a scrambler RAN.

The selecting device CH provides the control signal CON, receives a clock signal CL, and exchanges data with the memory device MEM. The scrambler RAN exchanges data with the memory device MEM and receives data from the selecting device CH.

The memory device MEM contains a list of eight allocation elements. Each of these allocation elements occupies a given position in this list and points to one of the outputs OUT0 to OUT7.

The list in the memory device MEM may also contain more than eight allocation elements, and two or more allocation elements may point to one of the outputs OUT0 to OUT7. This may be advantageous if different outputs are to be selected with different frequencies.

The outputs OUT0 to OUT7 are assigned code numbers 0 to 7. An allocation element thus consists of the code number of the output to which it points. The allocation element may also consist of other data identifying one of the outputs OUT0 to OUT7.

The memory device MEM is, for example, a RAM (=random access memory) with eight locations, one for each code number.

The clock signal CL can come from an internal clock generator of the controller CONTR. It determines the rate at which the controller CONTR selects new outputs. The clock signal CL may also be generated by an external clock generator. This is particularly advantageous if this clock generator influences the arrival of data packets at the input IN.

The selecting device CH reads allocation elements from the memory device MEM at the rate determined by the clock signal CL. It reads the allocation elements periodically, in allocation cycles, in the order in which they are stored in the list contained in the memory device MEM. When the selecting device CH has arrived at the last allocation element, it notifies the scrambler RAN thereof. Then it reads the first allocation element again, thus starting a new allocation cycle.

The selecting device CH may also read the allocation elements from the memory device MEM in an order different from that in which they are stored in the list.

The scrambler RAN, e.g. changes the positions of the allocation elements between two allocation cycles by a cyclic shift operation and a random swap operation. The end of each allocation cycle is indicated to the scrambler RAN by a corresponding message from the selecting device CH. Before the selecting device CH begins a new allocation cycle, the scrambler RAN has ceased its operation.

It is also possible to store in the memory device MEM two or more lists which are used in parallel. These lists would then be processed alternately by the selecting device CH and the scrambler RAN, so that in the case of two lists, for example, allocation elements would be read from one list and the allocation elements in the other list would be scrambled simultaneously. This makes it possible to carry out the novel method even more quickly.

A more detailed example of a procedure such as may be carried out by the scrambler RAN for changing the positions of the allocation elements will now be explained with reference to FIG. 2.

Figure 2:
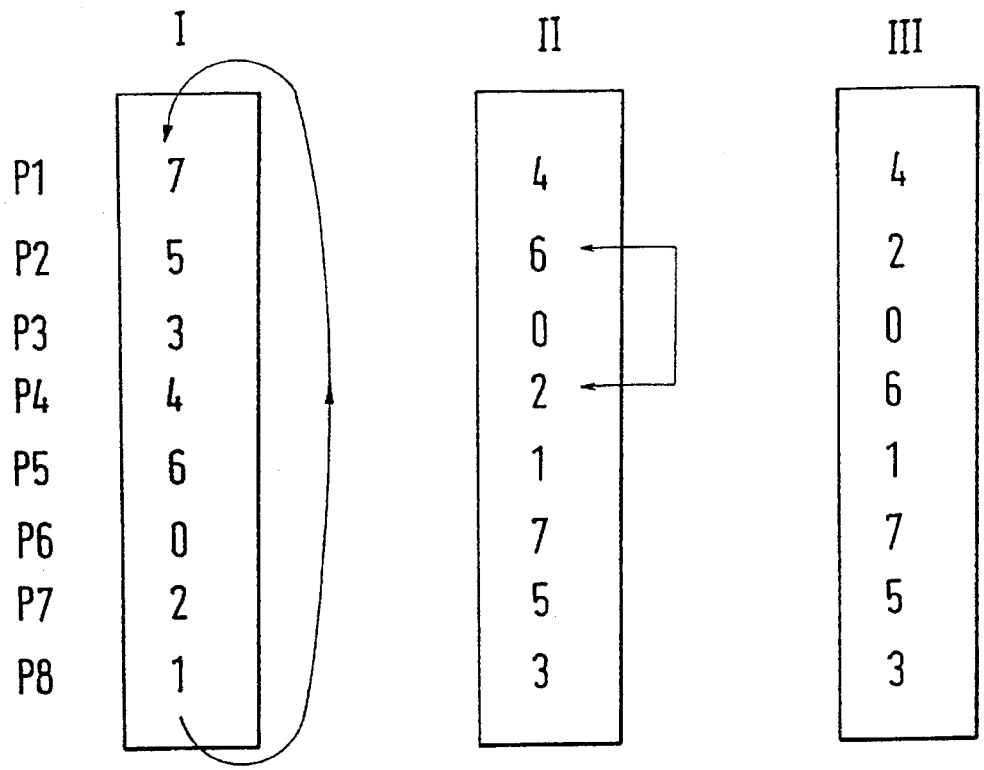
FIG. 2 is a scheme, according to the present invention for changing a list for the first embodiment.

FIG. 2 shows the code numbers contained in eight positions P1 to P8 of a list in the memory device MEM at the times I, II, and III.

At the time I, positions P1 to P8 contain the code numbers 7, 5, 3, 4, 6, 0, 2, and 1, respectively. As a first step, the scrambler RAN performs a cyclic shift by 5 positions. A cyclic shift by other numbers of positions is also possible. The cyclic shift operation may also shift the allocation elements in an order different from that in which they are stored in the memory device MEM.

For the shift operation, the scrambler RAN may be fitted with a modulo-8 adder, for example. The selecting device CH holds a pointer which indicates the position of the first allocation element in the list. By means of the modulo-8 adder, three is added modulo 8 to the value of this pointer. The result lies in the range from 0 to 7 (carries are deleted) and is stored as a new pointer value. A second possibility is to provide the scrambler with a buffer into which the allocation elements from the memory device MEM are entered sequentially in order to be subsequently re-entered into the memory device MEM in a changed order.

Other possibilities will be evident to those skilled in the art, according to the teachings hereof.

After the shift operation, at the time II, the list in the memory device MEM contains the code numbers 4, 6, 0, 2,

1, 7, 5, and 3. As a second step, the scrambler RAN can, for example, perform a swap operation. In that case, it interchanges the code numbers in positions 2 and 4 randomly in the sense that the positions of the code numbers to be interchanged are fixed and that the performance or nonperformance of the swap depends on chance.

For such a random swap operation, the scrambler RAN may be equipped with a random sequence generator. Such a generator can be constructed, for example, from a shift register with multiple feedback, as is generally known. The generator provides a bit which is randomly 1 or 0 and drives a swapping circuit. Such a swapping circuit can be implemented with a sequential logic system which on application of a 1 swaps two code numbers. To do this, it applies a first predetermined address, which corresponds to the position of a first code number, to the address input of the RAM forming the memory device MEM, reads the code number and stores it temporarily. The same process is repeated for a second code number, whose position is determined by a second predetermined address. The two temporarily stored code numbers are then written into the RAM interchanged, i.e., with the second address applied to the address input of the RAM for the first code number, and the first address for the second code number.

If the swap takes place, the list in the memory device MEM contains the code numbers 4, 2, 0, 6, 1, 7, 5, and 3 at the time III, i.e., after the random swap operation.

This mode of operation of the scrambler RAN offers the advantage that a lower limit is fixable for the number of clock periods of the clock signal CL which elapse between successive selections of an input. A lower limit of 3 clock periods is obtained here. This limit value is calculated as follows: cyclic shift by 5 positions minus swap of code numbers which are two positions apart. This gives a lower limit of 3 positions.

As the absolute upper limit for the number of clock periods elapsing between successive selections of an input, two times the number of inputs minus 1, i.e., 15, is obtained.

In a second embodiment, of the present invention, also, the application of the novel method and the use of a novel facility in a traffic mixer will be explained.

The traffic mixer is identical in construction to that of FIG. 1. Only the operation of the scrambler differs from that of the scrambler RAN of FIG. 1.

The operation of the scrambler will now be explained with the aid of FIG. 3.

Figure 3:
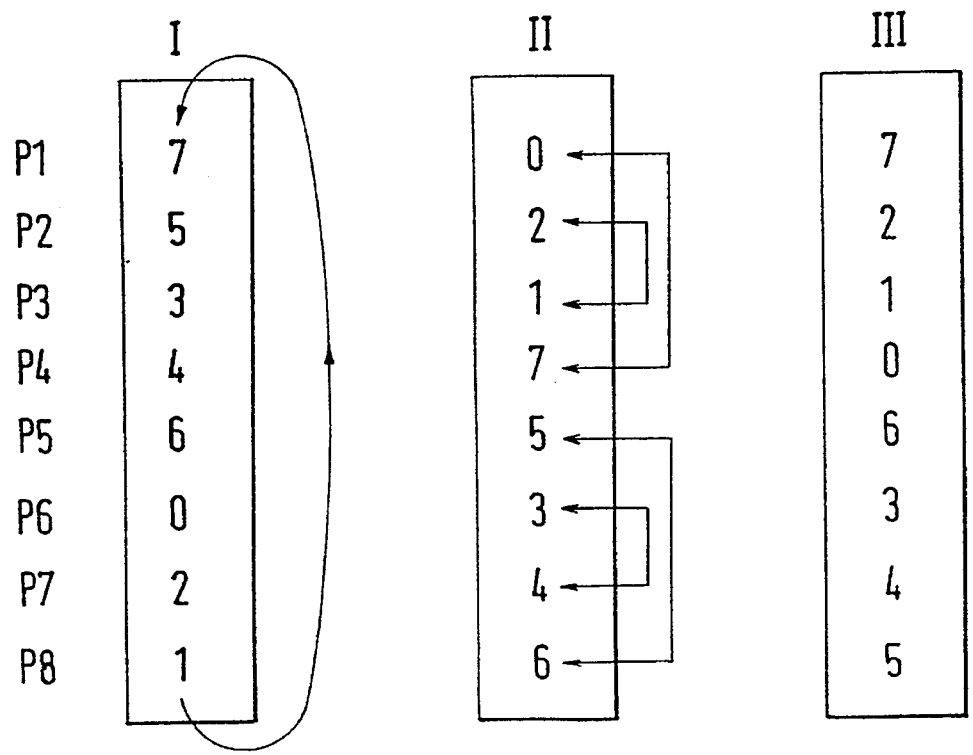
FIG. 3 is a scheme, according to the present invention for changing a list for the second embodiment.

FIG. 3 shows the code numbers contained in positions P1 to P8 of the list in the memory device MEM at the times I, II, and III.

At the time I, the selecting device CH has just completed an allocation cycle, and the scrambler is beginning to change the list in the memory device MEM by a random cyclic shift operation. At the time II, the scambler has completed the random shift operation, and the selecting device CH is starting a new allocation cycle. After completion of this allocation cycle, the scrambler changes the list by a random swap operation. At the time III, the random swap operation has been completed, and the selecting device CH is starting another allocation cycle. Thus, a cyclic shift operation and a swap operation are performed alternately between every two allocation cycles.

At the time I, positions P1 to P8 of the list contain the code numbers 7, 5, 3, 4, 6, 0, 2, and 1, respectively. The scrambler now performs a random cyclic shift operation. According to a random variable, it shifts the list cyclically by 3, 4, or 5 positions, here by 3 positions.

It is also possible to perform a random cyclic shift by another number of positions.

After the cyclic shift, at the time II, the list contains the code numbers 0, 2, 1, 7, 5, 3, 4, and 6. After the next allocation cycle, the list is changed by four random swap operations.

The positions to be swapped were determined beforehand. Positions P1/P4, P2/P3, P5/P8, and P6/P7 are pairs for a possible swap in pairs. In the case of each of these pairs, the performance or nonperformance of the swap depends on chance. Thus, for example, four independent random generators are needed, each of which drives one swap circuit. In this example, a swap takes place in the case of the pairs P1/P4 and P6/P8. Thus, the list contains the code numbers 7, 2, 1, 0, 6, 3, 4, and 5 at the time III.

It is also possible to swap another number of positions or according to another scheme in pairs. The predetermination of the positions to be swapped can also be dispensed with. The selection of the positions to be made could be made on a random basis, for example. Several positions may also be swapped according to a scheme other than the swap in pairs.

The scrambler of the first embodiment operates with random swap operations, and the scrambler of the second embodiment with random shift operations and random swap operations. A scrambler which operates only with random shift operations and with deterministic swap operations is also possible.

In conclusion, an example of the use of facilities according to the invention in an exchange will be explained.

Switching elements are frequently required to distribute data packets or data cells from input lines to a group of output lines. Such a group may comprise all output lines or a subset thereof. For this distribution, one or more facilities according to the invention are used. For the place where these facilities are used, there are several possibilities.

With a traffic mixer as described with reference to FIG. 1, the traffic streams arriving at the inputs of the switching element can be united into one traffic stream, which is then distributed to the outputs of the switching element.

The traffic streams arriving at the inputs can be united into one traffic stream which is then distributed to the outputs with a traffic mixer as described with reference to FIG. 1.

The data packets or data cells of the incoming traffic stream may be assigned to output groups. The traffic streams are united into two or more group traffic streams which are then distributed to the outputs of the switching element by one or more traffic mixers as described with reference to FIG. 1.

A switching network of an exchange consists of two or more switching stages. It is advantageous to design the first half of the switching stages as distribution stages which distribute the traffic arriving at the switching network across the inputs of the subsequent switching stages. Such a distribution stage will be implemented with a traffic mixer as described with reference to FIG. 1, or with two or more such traffic mixers connected in cascade. It is also possible to construct such a distribution stage from two or more switching elements as are described above.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A facility for randomly selecting one out of N nodes for receiving a data packet therefrom or for providing a data packet thereto, comprising:

a memory device (MEM);

a scrambler (RAN); and a selecting device (CH), wherein the memory device (MEM) contains an allocation list with at least N allocation elements which each point to a respective one of the N nodes, wherein the scrambler (RAN) is designed to change the positions (P1 to P8) of the allocation elements in the allocation list in the memory device (MEM) by cyclic shift operations and by swap operations, in response to an end-of-cycle signal from the selecting device, at least one of said operations being performed on a random basis, and wherein the selecting device (CH) is designed to periodically process the allocation list in the memory device (MEM) during allocation cycles in response to a clock signal to select the respective node to which the current allocation element points.

2. A facility as claimed in claim 1, wherein the nodes comprise a group of N lines over which data packets are received.

3. A facility as claimed in claim 1, wherein the nodes comprise a group of N lines to which data packets are distributed.

4. A facility as claimed in claim 1, wherein the N like units are N processors to which processes are distributed.

5. A switching element having a facility for randomly selecting one out of N nodes for receiving a data packet therefrom or for providing a data packet thereto, wherein the switching element includes a memory device (MEM);

a scrambler (RAN); and a selecting device (CH), wherein the memory device (MEM) contains an allocation list with at least N allocation elements which each point to a respective one of the N nodes, wherein the scrambler (RAN) is designed to change the positions (P1 to P8) of the allocation elements in the allocation list in the memory device (MEM) by cyclic shift operations and by swap operations, in response to an end-of-cycle signal from the selecting device, at least one of said operations being performed on a random basis, and wherein the selecting device (CH) is designed to periodically process the allocation list in the memory device (MEM) during allocation cycles in response to a clock signal to select the respective node to which the current allocation element points.

6. A switching network comprising a plurality of switching stages, at least one of which is a distribution stage having at least one facility for randomly selecting one out of N like units (OUT0 to OUT7), wherein the facility includes:

a memory device (MEM);

a scrambler (RAN); and a selecting device (CH), wherein the memory device (MEM) contains an allocation list with at least N allocation elements which each point to a respective one of the N nodes, wherein the scrambler (RAN) is designed to change the positions (P1 to P8) of the allocation elements in the allocation list in the memory device (MEM) by cyclic shift operations and by swap operations, in response to an end-of-cycle signal from the selecting device, at least one of said operations being performed on a random basis, and wherein the selecting device (CH) is designed to periodically process the allocation list in the memory device (MEM) during allocation cycles in response to a clock signal to select the respective node to which the current allocation element points.

7. An exchange comprising at least one facility for randomly selecting one out of N nodes, wherein the facility includes:

a memory device (MEM);

a scrambler (RAN); and a selecting device (CH), wherein the memory device (MEM) contains an allocation list with at least N allocation elements which each point to a respective one of the N nodes, wherein the scrambler (RAN) is designed to change the positions (P1 to P8) of the allocation elements in the allocation list in the memory device (MEM) by cyclic shift operations and by swap operations, in response to an end-of-cycle signal from the selecting device, at least one of said operations being performed on a random basis, and wherein the selecting device (CH) is designed to periodically process the allocation list in the memory device (MEM) during allocation cycles in response to a clock signal to select the respective node to which the current allocation element points.

8. A method of randomly selecting one out of N nodes for receiving a data packet therefrom or for providing a data packet thereto, comprising the steps of:

providing an allocation list containing at least N allocation elements which each point to one of the N nodes;

selecting an allocation element from the allocation list during an allocation cycle in response to a clock signal; and randomly rearranging the allocation list by cyclic shift operations and swap operations in response to a end-of-cycle signal, at least one of the operations being performed on a random basis.

9. A method as claimed in claim 8, wherein between every two allocation cycles, a cyclic shift operation and a swap operation are performed, one of said two operations being performed on a random basis.

10. A method as claimed in claim 8, wherein a cyclic shift operation and a swap operation are performed alternately between every two allocation cycles.

11. A method as claimed in claim 8, wherein during the cyclic shift operations, the allocation elements are shifted cyclically by M positions.

12. A method as claimed in claim 8, wherein during the swap operations, those positions in the list which are to be swapped are fixed, and wherein whether the swap occurs is random.

13. A method as claimed in claim 12, wherein the allocation elements are swapped in pairs.

14. A method as claimed in claim 8, wherein during the cyclic shift operations, the allocation elements in the list are cyclically shifted by a random number of positions.

* * * * *